United States Patent Office 3,119,706
Patented Jan. 28, 1964

3,119,706
PROCESS FOR CONDITIONING PIGMENTS
William E. Bachmann, Lancaster, N.Y., assignor to Allied Chemical Corporation, a corporation of New York
No Drawing. Filed Apr. 11, 1958, Ser. No. 727,787
9 Claims. (Cl. 106—309)

The present invention concerns a novel process for conditioning pigments so that they may be isolated as presscakes which have the unusual property of drying routinely to powders possessing high tinctorial strength and extremely soft texture.

Crude organic pigments, e.g., of the phthalocyanine, azo, indigoid, and anthraquinone series, are usually produced in finely divided form by precipitating them in aqueous medium, e.g., by "acid-pasting" and other precipitation methods, in order to make suitable starting materials for commercial use. By "acid-pasting" is meant the known process which involves dissolving the crude organic pigments in concentrated sulphuric acid or an equivalent thereof, e.g., chlorosulfonic acid, alkyl sulphuric acids, etc. and adding the resulting solution to a relatively large excess of water, whereupon the pigment precipitates from the diluted acid medium and is thereafter isolated by filtration.

For many commercial applications it is necessary to convert the aqueous pigment pulp isolated from such aqueous precipitation methods, e.g., as a press-cake, into a dry powder. Unless special precautions are taken, the drying of such aqueous pigment pulps results in products containing hard, gritty aggregates and agglomerates which even after prolonged mechanical grinding possess poor texture and low tinctorial value.

In the prior art, most methods used to reduce the tendency of aqueous pigment particles to agglomerate and aggregate during storage or drying, involve treating the pigment pulp with an organic material which will coat the particles, thereby helping to preserve their original fineness and particle size during the drying step. Some methods involve treatment of the pigment pulp with non-volatile additions. For example, British patent specification 560,050 discloses the treatment of an aqueous suspension of pigment pulp with ammonium naphthenate and then drying the treated aqueous paste. However, to the extent that such additives are non-volatile or are not otherwise removed, they contaminate the dry pigment and are therefore unsuitable.

According to a superior method of commercial importance, the aqueous pigment pulp is treated with a water-immiscible, volatile organic liquid; e.g., toluene, which preferentially wets the pigment particles, after which the water and the organic liquid are successively removed by evaporation. For example, British patent specification 517,476 discloses the admixing of an aqueous paste of a water-insoluble pigment with a cationic surface active compound; e.g., dicetyl dimethyl ammonium bromide, and a volatile, water-immiscible liquid that is not a solvent for the pigment, e.g., toluene, and thereafter drying the paste obtained. It is recognized in the patent that with this method a final pulverizing may be necessary. United States Patents Nos. 2,138,048 and 2,138,049 disclose similar methods for conditioning pigments that include a treatment of aqueous suspensions of pigments with volatile water-immiscible organic liquids followed by removal of the water and the volatile liquid.

United States Patent No. 2,268,144 is directed to a modification of the method described above. Such modification involves the use of surface active agents to produce emulsions of the volatile hydrocarbon liquid in water, with which an aqueous suspension of the pigment pulp is treated. Thereafter, the emulsion is broken and the resulting slurry is dried to remove water and the volatile liquid by evaporation. Although this modification produces improved results, it requires carefully controlled conditions and elaborate equipment for handling such emulsions. Furthermore, all of the foregoing methods that employ a volatile hydrocarbon solvent are objectionable in that they require the removal of such solvent by evaporation. This entails additional expenses and precautions in view of the safety and personnel hazard involved.

A method for the treatment of aqueous pastes of dyestuffs or intermediates wherein a water-miscible organic liquid is employed to precipitate dispersing agent from a dispersion of the dyestuff in aqueous solution of a dispersing agent is disclosed in British patent specification 378,034. In this method the organic liquid and water form a single liquid phase at all times. The quality of the resulting powders leaves much to be desired. The method, moreover, requires a dispersing or wetting agent that is insoluble in the organic liquid employed.

None of the foregoing methods of the prior art, whether utilizing water-immiscible or water-miscible solvents, results in pigment powders having the desired optimum degree of good texture and high tinctorial value.

With the foregoing disadvantages and shortcomings of the prior art in mind, it is a primary object of this invention to provide a process for conditioning aqueous pigment pulps, press cakes, and the like whereby dry pigment powders are obtained that are of excellent quality and soft texture, are free from hard aggregates and agglomerates, and have high tinctorial value.

Another object of this invention is to provide a process for conditioning pigments that is operable under a wide range of pH conditions.

It is yet another object of this invention to provide a process that does not necessitate the use of surfactants.

Other objects and advantages of the present invention will become apparent from the description thereof that follows.

In accordance with my invention, a pigment is treated or admixed with an aqueous solution of a water-soluble, volatile organic liquid and a salting out agent; and thereafter, pigment is separated from the organic liquid and the salting out agent. More specifically, a pigment pulp is agitated in aqueous medium in the presence of a water-soluble organic liquid defined below, which is in part undissolved in the medium by virtue of the presence of a dissolved salting out agent. The aqueous pigment slurry thus obtained is then treated to remove the organic liquid and salting out agent by physical means. Preferably the organic liquid is removed by evaporation. The pigment may be isolated by filtration and washed with water to remove the salting out agent and residual organic liquid. The pigment press cake thus obtained may be dried in any suitable manner, e.g., in vacuo, or in an atmospheric drier, to produce a dry, extremely friable product, which is free from extraneous materials and effectively preserves the tinctorial strength and particle size of the initial pigment pulp.

The organic liquids suitable for this invention are selected from the group consisting of the lower monohydric alcohols, ketones, esters and ethers, which are soluble in water to the extent of at least one part per 20 parts of water at 25° C. and which form aqueous solutions having a vapor pressure greater than 1 atmosphere at 100° C. Liquids of this type which are particularly useful include saturated alcohols and ketones containing not more than 6 carbon atoms, and the esters of acetic and formic acids which meet the above requirements. Specific compounds include: acetone, butanone, diacetone alcohol, methyl alcohol, ethyl alcohol, isopropyl alcohol, 1-butanol, 2-butanol, isobutyl alcohol, tertiary butyl alcohol, 3-pentanol, methoxybutanol, ethyl formate, ethyl acetate, β-ethoxyethyl acetate, methoxybutyl acetate, 1,2-diethoxyethane. Ethers and esters are operative but are less preferred for reasons of safety. It is preferred to use those organic liquids defined above which are not completely miscible in water, since they are more effective in my process and require relatively small amounts of salting out agent in the process of my invention and can be recovered at known strength from the conditioning liquor by distillation.

Any salting out agent may be used, which is sufficiently soluble in water to cause some of the organic liquid to be "salted out" and thereby separate from the aqueous solution under the treatment conditions in the presence of the pigment particles. The phenomenon of "salting out" is well known and includes the use of water soluble substances, e.g., electrolytes, to reduce the solubility of organic liquids in aqueous solution and thereby cause some of the organic liquid to separate as a distinct phase. Common salt is very effective and inexpensive and is hence preferred. However, other salting out agents may be effectively employed, notably electrolytes, particularly alkali metal and ammonium salts of organic and inorganic acids, e.g., sodium acetate, sodium sulfate, ammonium sulfate, potassium chloride, ammonium chloride, magnesium chloride.

Addition of salting out agent, such as common salt, to an aqueous organic solution containing suspended pigment particles displaces or "salts out" the organic liquid from its aqueous solution, causing it to coat the pigment particles which then coagulate to form a suspended semisolid phase.

In general, best results are obtained by introducing the salting out agent to the aqueous pigment medium containing the dissolved organic liquid. However, some improvement in pigmentary properties can be realized by charging the organic liquid after the addition of the salting out agent. This latter order of addition is favored only with organic liquids of the defined type, which are completely miscible with water.

A sufficient amount of water should be employed to dissolve the organic liquid completely. If the organic liquid is present in amounts greater than that which will completely dissolve in the mixture of aqueous pigment suspension to be treated with the salting out agent according to my process, pigment may flush into such excess of organic liquid. To the extent that such flushing occurs it interferes with the beneficial action of my process. Hence, the presence of a substantial excess of organic liquid beyond that which will dissolve in the aqueous liquor prior to the salting out step of my invention is preferably avoided.

It is important for good results to avoid the salting out of excessive amounts of organic liquid relative to the pigment from aqueous solution in my process, since it tends to deteriorate the quality of the pigment produced.

Under the optimum conditions of the invention, no distinct phase of organic liquid is observed after addition of the salting out agent to the pigment slurry, although the separation of organic liquid could be noted if the pigment suspension were not present.

The use of a salting out agent according to my invention is essential. In the absence of a salting out agent no substantial improvement in pigmentary properties is obtained even when excess organic liquid is employed in amount duplicating the quantity normally "salted-out" in the usual procedure.

The relative proportions of water, pigment, organic liquid and salting out agent required to give optimum results varies with different pigments, and can be readily determined by routine experiment. The relative proportions are not critical as long as sufficient salting out agent is used to produce the desired quality of pigment product.

In practice it is convenient to use sufficient water to give a mixture which can be readily agitated. In general, the preferred proportions are:

1 part organic pigment (dry basis)
15–30 parts water
.25–2.5 parts organic liquid Larger amounts of water and/or organic liquid are operative but they are less preferred for economic reasons; while lower proportions, e.g., as low as 0.1 part of organic liquid, are effective to some degree.

After addition of the salting out agent it is advantageous for best pigmentary results to heat the mass, e.g., to the boil, during which step the organic liquid may be conveniently removed and recovered by simple distillation. The pigment may be filtered off, washed free of salting out agent, and dried.

The following examples illustrate the invention. All parts are given by weight. "Pr." is an abbreviation of "Prototype" and "C.I." is an abbreviation of "Color Index."

*Example 1*

Crude, chlorine-free copper phthalocyanine blue (C.I. Pigment Blue 15, C.I. No. 74160) was "acid-pasted" in known manner to make a water pulp containing 11.4% real color.

Five hundred and seventy parts of said water pulp containing 65 parts real color were admixed with a solution containing 154 parts normal butanol dissolved in 2200 parts of water at room temperature. 257 parts of aqueous 22% sulfuric acid and 585 parts of sodium chloride were added to the dispersion of pigment in aqueous alcohol with agitation.

The resulting mass was heated and held at about 90° C. until all alcohol was distilled off as its water azeotrope. Distillation was discontinued after the liquid temperature rose above 95° C. and the alcohol-free brine-pigment suspension was filtered to isolate the pigment. The pigment cake was washed with water on the filter until free of acid and salt and thereafter dried in an air oven at 60° C. The dry pigment was extremely soft.

This pigment was compared with a sample of the best known phthalocyanine toner commercially available by means of a standard Hoover Muller texture test for dispersibility. The pigment prepared above was softer in texture and stronger tinctorially than the commercial sample.

*Example 2*

When copper phthalocyanine green (C.I. Pigment Green 7, C.I. No. 74260) pulp was processed in the manner described in Example 1, a soft, bright powder was obtained, which when tested in the aforesaid manner was found to have superior texture and greater tinctorial strength than a sample of the best commercially available equivalent type of copper phthalocyanine green toner.

*Example 3*

The treatment of copper phthalocyanine blue given in Example 1 was repeated with the omission, however, of the sulfuric acid. The isolated pigment was substantially identical with that obtained in Example 1, thus clearly demonstrating the operativeness of the process under different extremes of pH.

*Example 4*

C.I. Vat Red 35 (C.I. No. 68000) pulp containing 13.4% real color was submitted to the process of Example 1, with appropriate adjustments made in the batch to compensate for solids difference in the pulp. The sulfuric acid was omitted as above. The treated pigment was compared in a texture test against a high quality extended toner containing aluminum hydrate, at the same concentration of real color, and was observed to be appreciably stronger tinctorially than the control.

Example 5

Additional experiments were conducted using acetone, isopropyl alcohol, and diacetone alcohol as the water-miscible organic liquid. In each case, 450 parts of water slurry containing 30 parts real copper phthalocyanine blue were admixed with 150 parts of sodium chloride at room temperature. After the salt was dissolved, 45 parts of the particular organic liquid was added with agitation. Then the mass was heated to distill off the organic liquid: the acetone was distilled from the mixture at about 57° C.; and the isopropyl alcohol and the diacetone alcohol distilled off as their water azeotropes at 80 and 99° C. respectively. The pigment was then filtered off, washed and dried. The treated pigments were essentially equal to that obtained in Example 1.

Example 6

One hundred and fifty-two parts of copper phthalocyanine blue pulp containing 30 parts of real color were admixed with 45 parts of 2-butanol and 328 parts of water. The mass was thoroughly agitated and charged with 90 parts of anhydrous sodium sulfate. The mixture was heated with agitation and the alcohol was distilled off as its water azeotrope at about 88° C. The mass was filtered and the filter cake was washed salt-free with water, and dried. A soft textured pigment was obtained, which although satisfactory tinctorially, was not as strong as the pigment obtained in Example 1.

Example 7

The process of the invention was repeated using a number of additional organic liquids as well as several different pigments. According to the procedure, a slurry was made from aqueous pigment press cake containing 12.6 parts of real color, 190 parts of water, 19 parts by weight of organic liquid and 50 parts of sodium chloride. Suitable adjustments were made to compensate for color solids and water content of the aqueous pigment press-cake when using different pigments. When necessary, e.g., with pentanol-3, additional water, sufficient to dissolve the organic liquid, was added. The organic liquids were distilled off as their water azeotropes as before. The pigments and organic liquids used in a series of eight different batches are listed as follows:

| Batch | Dye | Organic Liquid |
|---|---|---|
| (a) | copper phthalocyanine blue | isobutyl alcohol. |
| (b) | ------do------ | 3-pentanol. |
| (c) | ------do------ | ethyl acetate. |
| (d) | ------do------ | ethyl formate. |
| (e) | ------do------ | methyl ethyl ketone. |
| (f) | C.I. Vat Orange 3; C.I. No. 59300 | isobutyl alcohol. |
| (g) | C.I. Vat Violet 2; C.I. No 73385 | Do. |
| (h) | C.I. Pigment Blue 25; C.I. No. 21180 | Do. |

The treated pigments all possessed a softer texture and a greater tinctorial strength than their commercially available equivalents.

An advantage of my process is that it may be operated under a wide range of pH conditions. For example, it is effective in the presence of substantial amounts of acids, alkalies or salts normally associated with pigments obtained by precipitation and recovery from aqueous media.

It is not necessary or desirable in most cases to use surfactants in my process. However, some vat dye pigments may be processed with more consistent and improved results by treating them according to my invention in the presence of a suitable surfactant, especially cationic and nonionic (e.g., ethylene oxide condensation products) types.

This process is ideally suited for full-scale manufacture of pigments, since all operations involving organic liquids may be conducted in closed equipment; e.g., ordinary kettles and conventional stills, facilitating solvent recovery and minimizing fire and personnel hazards. The cost or relative amount of organic liquid used is unimportant in practice since such liquid can be easily recovered for reuse during the normal course of the process.

Conventional means of agitation are sufficient for successful application of this process. The use of colloid mills and other special mixing devices is rarely necessary. Filtration, washing and drying operations involved in this process are likewise conducted in routine manner in conventional filter presses, nutsches and dryers, and do not present any unusual difficulty in regard to hazard or disposal of wastes.

Since certain changes may be made in carrying out the above method without departing from the scope of the invention, it is intended that all matter contained in the above description shall be interpreted as illustrative and not in a limiting sense.

I claim:

1. A method for conditioning organic pigments comprising (1) dispersing a pigment in an aqueous solution of (a) a water-soluble, volatile organic liquid capable of being salted out, and (b) a salting out agent in amount sufficient to cause salting out of at least a portion of said water-soluble, volatile, organic liquid; and (2) thereafter separating said pigment from said organic liquid and salting out agent.

2. A method for conditioning organic pigments comprising (1) dispersing a pigment in a monophase aqueous solution of a water-soluble, volatile organic liquid capable of being salted out, (2) admixing salting out agent with said dispersion, the proportions of salting out agent and organic liquid being sufficient to form in the absence of pigment a discernible second liquid phase of said organic liquid, and (3) thereafter separating said pigment from said organic liquid and said salting out agent.

3. A method for conditioning organic pigments comprising (1) treating an aqueous dispersion of a pigment with an amount of a water-soluble, volatile organic liquid capable of being salted out and that is completely soluble in the water of said dispersion, (2) admixing salting out agent with said dispersion, the proportions of salting out agent and organic liquid being sufficient to form only in the absence of pigment a discernible second liquid phase of said organic liquid, and (3) thereafter separating said pigment from said organic liquid and said salting out agent.

4. A method for conditioning organic pigment comprising (1) admixing a water slurry of a pigment with salting out agent, (2) introducing a completely water-miscible, volatile organic liquid capable of being salted out, into the aqueous mixture, the proportions of salting out agent and organic liquid being sufficient to form in the absence of pigment a discernible second liquid phase of said organic liquid, and (3) thereafter separating said pigment from said organic liquid and said salting out agent.

5. A method for conditioning organic pigments comprising (1) treating a pigment pulp in an aqueous solution of a water-soluble, volatile organic liquid capable of being salted out, and a salting out agent in amount sufficient to cause salting out of at least a portion of said water-soluble, volatile, organic liquid, (2) separating said volatile organic liquid from said pulp by evaporation, and (3) separating said salting out agent from said pulp by washing.

6. A method for conditioning organic pigments comprising (1) agitating a pigment pulp in an aqueous solution of (a) a water-soluble, volatile organic liquid capable of being salted out, and (b) a salting out agent in amount sufficient to cause salting out of at least a portion of said water-soluble, volatile, organic liquid, (2) separating said volatile organic liquid from said pulp by distillation, (3) separating said salting out agent from said pulp by washing with water, and (4) thereafter, drying the separated pulp.

7. A conditioned organic pigment obtained by the method defined in claim 6.

8. A method for conditioning organic pigments comprising (1) agitating a pigment pulp in an aqueous solution of (a) a water-soluble, volatile organic liquid selected from the group consisting of the lower monohydric alcohols, ketones, esters and ethers which are soluble in water to the extent of at least 1 part per 20 parts of water at 25° C., and which form aqueous solutions having a vapor pressure greater than 1 atmosphere at 100° C., and (b) a salting out agent selected from the group consisting of alkali metal and ammonium salts of organic acids and alkali metal and ammonium salts of inorganic acids, said salting out agent being present in amount sufficient to cause salting out of at least a portion of said water-soluble, volatile, organic liquid, (2) separating said volatile organic liquid from said pulp by distillation, (3) separating said salting out agent from said pulp by washing with water, and (4) thereafter, drying the separated pulp.

9. A method for conditioning organic pigments as claimed in claim 8 wherein the salting out agent consists essentially of sodium chloride.

References Cited in the file of this patent
UNITED STATES PATENTS

| | | |
|---|---|---|
| 2,152,716 | Van Wirt et al. | Apr. 4, 1939 |
| 2,515,145 | Van Dijck | July 11, 1950 |
| 2,556,727 | Lane et al. | June 12, 1951 |
| 2,791,589 | Pugin | May 7, 1957 |
| 2,816,114 | Ehrich et al. | Dec. 10, 1957 |